Patented Sept. 24, 1940

2,215,623

UNITED STATES PATENT OFFICE 2,215,623

PIGMENT AND METHOD OF MAKING SAME

William D. Stillwell, Cleveland Heights, Ohio, assignor to The Harshaw Chemical Company, Elyria, Ohio, a corporation of Ohio No Drawing. Application December 31, 1937, Serial No. 182,853

8 Claims. (Cl. 106—36.2)

For many years the main yellow colorants available in ceramics have been from the following groups: (a) cadmium sulphide; (b) rutile stains; (c) uranium stains; (d) vanadium-tin stains; (e) iron stains; (f) chromium stains; (g) lead-antimony (Naples yellow) stains; and (h) silver stains. More recently, an antimony-titania-chromium stain, and a ceria-titania stain have been described. Most of these stains are quite specific in action, and very limited in their usage. A yellow uranium stain for example, is used mostly in glass and glazes, while an antimony-titania-chromium stain is practically limited to body stain, and cadmium sulphide because of its low decomposition temperature, is limited to low-fired glazes and vitreous enamel. In the field of vitreous enamels for example, only three of the afore-named stains furnish a color that can really be designated as yellow. These are cadmium sulphide, chromates, and Naples yellow. Cadmium sulphide yields a strong lemon-yellow enamel stain, but has the very undesirable characteristic of instability. Because of its low decomposition temperature in vitreous enamels it is troublesome and unreliable, but because of its brilliant lemon-yellow color continues to find wide use even though expensive. Special enamel frits are often used with this type of color. High percentages of cadmium sulphide in enamels are prone to cause scumming. A number of chromates, such as of lead, barium, strontium, etc., have been used as colorants in vitreous enamels, but these are very weak tinctorially, and, because of some solubility in the mill liquor of vitreous enamels they usually yield enamels having an undesirable scum. The reaction between lead oxide and antimony oxide to form lead antimonate or Naples yellow is well known in the art. While the mass-tones of such pigments are very strong, this material has mostly little strength as a ceramic pigment. It is common practice therefore to incorporate about 10 per cent of alumina or tin oxide or combinations thereof in the Naples yellow during manufacture, these materials being known in the trade as "stabilizers", and the resulting stain is more stable to repeated firings in an enamel. However, the color of Naples yellow in general is a brownish-yellow or orange-yellow, far different from the lemon-yellow of cadmium sulphide.

In accordance with the present invention, it now becomes possible to provide a particularly strong lemon-yellow stain altogether different from the lead antimony colors described foregoing, and having a lemon-yellow color not hitherto available with lead antimonate, and being less costly than lead antimonate containing tin oxide; and coupled with such advantages is a greater stability than existent in cadmium sulphide yellows, together with lower cost as compared therewith.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

I have found that a new color is formed from oxides of lead, antimony and titanium in specific proportions, this new color coinciding closely with the molecular formula $4PbO.Sb_2O_5.4TiO_2$. Any divergence from this formula results in lowering the desired qualities of this stain in vitreous enamels and glazes, in the following respects: (1) on increasing the titanium dioxide content, the yellow loses strength; (2) on decreasing the titanium dioxide content, the mass-tone becomes more orange in color, and the stain in enamels has much less strength; (3) on increasing the antimony oxide content, the yellow rapidly loses strength and increases in opacity; (4) on decreasing antimony oxide content, the yellow loses strength and opacity; (5) on increasing the lead oxide content, the yellow becomes more orange in color and loses the desirable lemon tone, and a larger increase in lead oxide causes the color to flux on firing; (6) on decreasing the lead oxide content, the yellow loses strength rapidly with increase in opacity. Practically, therefore, to attain the desired color without dilution or change, the oxides are maintained substantially within the limits of PbO 50–70 per cent, $Sb_2O_5$ 14–26 per cent, and $TiO_2$ 14–26 per cent.

For the materials in making up the present pigment, convenient sources of the elements concerned are employed, thus the source of antimony may be the trioxide, the source of titania the dioxide, and the source of lead may be an oxide or a compound yielding an oxide, such as white lead, red lead, litharge, etc., and lead titanate may be employed with the proper amount of antimony oxide. The materials in properly adjusted amounts to form the composition are calcined or heated to reaction under oxidizing conditions at a suitable temperature, which practically is around 1050–1100° C. Calcination at much lower temperatures does not develop the color sufficiently, whereas higher temperatures cause the material to sinter to a hard mass. Proper calcination is attained only when the batch and the furnace are maintained at substantially the same temperature throughout the firing cycle. After attaining the proper temperature, it is held constant for several hours to assure complete development of the color.

The following examples are illustrative of the invention:

I. Fifty-seven parts of litharge, 20 parts of antimony oxide, and 20 parts of titanium dioxide. The mixture is calcined under oxidizing conditions at about 1070° C. A light fluffy brilliant lemon color is attained. This is ready for use as a ceramic stain without further treatment such as ball-milling which is commonly required with colors heretofore.

II. Similarly, 58.2 parts of $Pb_3O_4$, 20 of $Sb_2O_3$, and 20 of $TiO_2$.

III. Similarly, 66.0 parts of white lead, 20 of $Sb_2O_3$, and 20 of $TiO_2$.

IV. Similarly, 228 of red lead, 80 of $Sb_2O_3$, and 100 of $TiO_2$.

V. Similarly, 228 of red lead, 50 of $Sb_2O_3$, and 80 of $TiO_2$.

VI. Similarly, 228 of red lead, 80 of $Sb_2O_3$, and 60 of $TiO_2$.

VII. Similarly, 200 of red lead, 80 of $Sb_2O_3$, and 80 of $TiO_2$.

VIII. Similarly, 350 of red lead, 80 of $Sb_2O_3$, and 80 of $TiO_2$.

IX. Similarly, 202 of red lead, 43.2 of $Sb_2O_3$, and 54 of $TiO_2$.

X. Similarly, 152 of lead titanate, and 40 of $Sb_2O_3$.

All parts are by weight, in the foregoing examples.

Other modes of applying the principle of the invention may be employed, change being made as regards the details described, provided the features stated in any of the following claims, or the equivalent of such, be employed.

I therefore particularly point out and distinctly claim as my invention:

1. A color composition, substantially of the molecular formula $4PbO.Sb_2O_5.4TiO_2$.

2. A color composition embodying PbO about 58.1 per cent, $Sb_2O_5$ about 21.1 per cent, and $TiO_2$ about 20.8 per cent.

3. A color composition consisting of the reaction product of red lead about 59.3 parts, antimony trioxide about 19 parts, and titanium dioxide about 20.8 parts, by weight.

4. A color composition consisting of a combination of PbO 50–70 per cent, $Sb_2O_5$ 14–26 per cent, and $TiO_2$ 14–26 per cent.

5. A process of making a color composition, which comprises calcining at 1050–1100° C. oxides of lead, antimony and titanium yielding $4PbO.Sb_2O_5.4TiO_2$.

6. A process of making a color composition, which comprises calcining at 1050–1100° C. a mixture providing PbO about 58.1 per cent, $Sb_2O_5$ about 21.1 per cent, and $TiO_2$ about 20.8 per cent.

7. A process of making a color composition, which comprises calcining at 1050–1100° C. red lead about 59.3 parts, antimony trioxide about 19 parts, and titanium dioxide about 20.8 parts, by weight.

8. A process of making a color composition, which comprises calcining at 1050–1100° C. materials to yield a product of the composition PbO 50–70 per cent, $Sb_2O_5$ 14–26 per cent, and $TiO_2$ 14–26 per cent.

WILLIAM D. STILLWELL.